(12) United States Patent
Baran, Jr.

(10) Patent No.: US 7,767,736 B2
(45) Date of Patent: Aug. 3, 2010

(54) FLAME RETARDANT POLYMER COMPOSITION

(75) Inventor: Jimmie R. Baran, Jr., Prescott, WI (US)

(73) Assignee: 3M Innovative Properties Company, St. Paul, MN (US)

(*) Notice: Subject to any disclaimer, the term of this patent is extended or adjusted under 35 U.S.C. 154(b) by 1190 days.

(21) Appl. No.: 11/275,033

(22) Filed: Dec. 5, 2005

(65) Prior Publication Data

US 2007/0129465 A1  Jun. 7, 2007

(51) Int. Cl.
*C08K 9/00* (2006.01)

(52) U.S. Cl. .................. 523/205; 525/259; 525/262; 525/474; 525/477; 525/479; 252/601; 252/610; 252/611; 524/492; 524/493; 524/543; 524/556; 523/209; 523/216; 523/213

(58) Field of Classification Search ............... 525/259; 521/91, 92, 154; 524/493, 555, 556
See application file for complete search history.

(56) References Cited

U.S. PATENT DOCUMENTS

| | | | |
|---|---|---|---|
| 2,801,185 A | 7/1957 | Iler | |
| 4,264,703 A | 4/1981 | Crivello | |
| 4,304,705 A | 12/1981 | Heilmann et al. | |
| 4,340,716 A | 7/1982 | Hata et al. | |
| 4,379,201 A | 4/1983 | Heilmann et al. | |
| 4,503,211 A | 3/1985 | Robins | |
| 4,522,958 A | 6/1985 | Das et al. | |
| 4,737,559 A | 4/1988 | Kellen et al. | |
| 4,985,340 A | 1/1991 | Palazzotto et al. | |
| 5,143,785 A | 9/1992 | Pujol et al. | |
| 5,204,219 A * | 4/1993 | Van Ooij et al. | 430/272.1 |
| 5,215,860 A | 6/1993 | McCormick et al. | |
| 5,648,407 A | 7/1997 | Goetz et al. | |
| 6,280,845 B1 | 8/2001 | Kollaja et al. | |
| 6,476,174 B1 * | 11/2002 | Lee et al. | 528/29 |
| 6,586,483 B2 * | 7/2003 | Kolb et al. | 521/91 |
| 2003/0197159 A1 | 10/2003 | Kinose et al. | |
| 2004/0050299 A1 * | 3/2004 | Wang et al. | 106/499 |
| 2004/0127580 A1 | 7/2004 | Baran, Jr. | |
| 2004/0127581 A1 | 7/2004 | Baran, Jr. et al. | |
| 2004/0241101 A1 | 12/2004 | Baran, Jr. et al. | |
| 2004/0242729 A1 | 12/2004 | Baran, Jr. et al. | |
| 2006/0276595 A1 * | 12/2006 | Baran et al. | 525/259 |

FOREIGN PATENT DOCUMENTS

| | | | |
|---|---|---|---|
| JP | 2001-152033 | | 6/2001 |
| JP | 2003-213144 | | 7/2003 |
| WO | 03/016217 | * | 2/2003 |
| WO | WO 2005/003224 A1 | | 1/2005 |

OTHER PUBLICATIONS

Chiang et al., Synthesis, characterization and thermal properties of novel epoxy containing silicon and phosphorous nanocompsites by sol-gel method. European Polymer Journal, 38 (2002) 2219-2224.*
"Epoxy Resin Technology," edited by P. F. Bruins, (1968), John Wiley & Sons, Inc., New York.
Lee et al., "Handbook of Epoxy Resins," (1967) McGraw Hill, Inc., New York.
Mark et al., "Encyclopedia of Polymer Science and Engineering," (1985), pp. 729-814, vol. 2, John Wiley & Sons, Inc., New York.
Odian, "Principles of Polymerization," (1991), 3rd Edition, John Wiley & Sons Inc., New York.
Weil, "Phosphorus Flame Retardants", Encyclopedia of Chemical Technology, (1993), pp. 976-998, vol. 10, 4th Edition, John Wiley & Sons, Inc., New York.
U.S. Appl. No. 11/275,075, Ylitalo et at., filed Dec. 8, 2005, entitled "Silver Ion Releasing Articles and Methods of Manufacture,".

* cited by examiner

*Primary Examiner*—Vasu Jagannathan
*Assistant Examiner*—Robert C Boyle
(74) *Attorney, Agent, or Firm*—Kent S. Kokko

(57) ABSTRACT

A composition is described comprising an organic polymer or a polymerizable monomer, having dispersed therein a surface-modified particle phase, in an amount sufficient to reduce the flammability of the polymer.

19 Claims, No Drawings

FLAME RETARDANT POLYMER COMPOSITION

FIELD OF THE INVENTION

The present invention is directed to flame retardant polymer composition and articles prepared therefrom.

BACKGROUND

Polymers have been modified with various additives in attempts to reduce the flammability (or increase the combustion resistance). Such additives have included phosphites, phosphates, thiophosphoric acid esters containing halogenated alkyl radicals and other halogenated organic compounds. With many such additives, they must be added at relatively high weight percentages that may adversely affect the physical and/or optical properties of the resulting articles. Polytetrafluoroethylene has been added, as an anti-drip and flame retardant agent, to many polymers, but adversely affects the clarity and transparency of molded articles made therefrom. Glass fibers may be added, but the addition adversely affects the polymer matrix and optical properties. In many applications, polymer compositions are rendered opaque by the addition of pigments to mask the reduced optical properties.

More recently there is an increasing need for new flame-retardants for polymer applications. Although existing products are effective at providing flame retardancy at low cost, concerns have been raised regarding the health and environmental risks as they are considered to be environmentally persistent, bioaccumulative materials. In some European countries there are proposals to ban the use of halogenated and heavy metal containing retardants.

SUMMARY

In one aspect, the present invention is directed to a polymer composition comprising an organic polymer selected from the group consisting of thermoplastic polymers, thermoset polymers, elastomers and mixtures thereof, having dispersed therein a surface-modified particle phase, in an amount sufficient to render the polymer flame retardant or self-extinguishing. The surface-modifying agent is an ambifunctional, organic, phosphorus-containing additive.

In another aspect, the invention provides a polymerizable composition comprising the surface modified nanoparticles and one or more polymerizable monomers. When polymerized, the resulting polymers have reduced flammability. In some embodiments the resulting polymers are self-extinguishing.

The polymer and polymerizable compositions of the present invention are useful in the preparation of shaped articles, such as those produced by casting, molding or extrusion. Included are automobile parts, electric motor housings, appliances, computer equipment such as monitor housings, aircraft parts, glass replacement, optical and headlamp lenses. Because the additive (the surface-modified particle phase) may be added at sufficient levels to reduce the flammability of the article without deleteriously affecting the optical properties, the composition is particularly useful in those applications where transparency or clarity is desired but where heretofore, opaque polycarbonates have been used.

The present invention overcomes problems in the art of providing a polymer composition that is flame retardant or (preferably) will not support combustion. The surface modified nanoparticles are readily compounded with the polymers and reduces or eliminates the exposure risks associated with conventional flame retardant additives such as polybrominated biphenyls. Additionally, the surface-modified nanoparticle additive does not generally adversely affect the mechanical or optical properties of the resulting polymers. In addition, the presence of the surface-modified nanoparticles reduce or prevent dripping during combustion, stabilize the shape of the article, and stabilize foaming at the outgassing of combustion products.

The nanoparticle phase may comprise silica, titania, alumina, zirconia, vanadia, ceria, iron oxide, antimony oxide, tin oxide, aluminum/silica and combinations thereof, and are less than 100 nanometers in average particle size.

The term "surface-modified nanoparticle" refers to a particle that includes functional groups attached to or coated on the surface of the particle and pendent phosphorus-containing groups. The surface-modifying agent modifies the character of the particle and may be coated on the nanoparticles, or covalently-or ionically-bonded to the nanoparticles.

The terms "particle diameter" and "particle size" refer to the average cross-sectional dimension of a particle. If the particle is present in the form of an aggregate, the terms "particle diameter" and "particle size" refer to the average cross-sectional dimension of the aggregate.

The terms "thermoset" and "thermoplastic" have their normal meaning in the polymer chemistry art. A "thermoset" resin is a cured resin that has been exposed to an energy source (e.g. heat and/or radiation) sufficient to make the resin incapable of flowing which results from chemical crosslinking reaction of reactive species. The term "thermosetting" means an uncured thermoset resin. A "thermoplastic" resin is one that is capable of softening or flowing when heated and of hardening again when cooled.

"Flame retardant" means a characteristic of basic flammability that has been reduced by some modification as measured by one of the accepted test methods such as the Horizontal Burn or Hanging Strip tests.

"Self extinguishing" refers to the inability of a material to sustain combustion without the addition of an external heat source. In the present invention, the flames extinguishes within 10 seconds, preferably within 5 seconds.

DETAILED DESCRIPTION

The polymer composition includes inorganic nanoparticles that are surface-modified by the phosphorus-containing surface modifying agent. The surface modifying agent is an ambifunctional organic compound having at least one functional group to bond, coordinate or attach to the surface of the inorganic nanoparticles, and at least one phosphorus containing functional group, which includes phosphorus-oxygen groups, phosphorus-nitrogen groups and phosphorus-halogen groups. By "surface modified" it is meant that the surface-modifying agent is coated on, or covalently or ionically bonded to the nanoparticles. The inorganic nanoparticles, having a particle diameter of less than 100 nanometers, are disposed in a polymer matrix. The surface-modified nanoparticles are preferably individual, unassociated (i.e., non-aggregated) nanoparticles dispersed throughout the polymer and preferably do not irreversibly associate with each other. The term "associate with" or "associating with" includes, for example, covalent bonding, hydrogen bonding, electrostatic attraction, London forces, and hydrophobic interactions.

While not wishing to be bound by theory, the organic phosphorus compounds may function as flame retardants by forming protective liquid or char barriers, which minimize transpiration of polymer degradation products to the flame and/or act as an insulating barrier to minimize heat transfer. The inorganic nanoparticles, to which the organic phosphorous surface modifying agents are attached, may serve as a heat sink, further retarding combustion.

The ambifunctional surface modifying has at least two functional groups. One reactive functional group is capable of covalently bonding or otherwise associating with the surface of the nanoparticles through surface functional groups thereon, and the second is a phosphorus-containing functional group. Examples of suitable phosphorus-containing groups include phosphorus-containing group is selected from phosphonic acids, phosphonates, phosphinates, phosphonites, phosphinites, phosphine oxides, phosphines, phosphites or phosphates, and nitrogen or halogen analogues thereof. Preferably the reactive functional group of the surface modifying agent forms a covalent bond with the functional groups on the surface of the inorganic nanoparticle.

Regarding the reactive functional group, reactive functionalities such as silyl, amino, hydroxyl, mercaptan, acrylate and methacrylate groups present on one component (the surface modifying agent or the nanoparticles) can react with complementary reactive functionalities, such as oxirane, hydroxyl, amino, halo-, aziridine, anhydride, acrylate, methacrylate, or isocyanato groups, present on the other component (surface modifying agent or nanoparticles). More than one surface modifying agent may be used.

Useful ambifunctional surface modifying agent are of the general formula:

$$X_n\text{—}R^1\text{—}Y_m \quad \text{(I) wherein:}$$

X represents a functional group that may bond to, or associate with, the surface of the inorganic nanoparticles, and is preferably selected from a silyl, hydroxyl, azido, mercapto, alkoxy, nitro, cyano, or amino group, $R^1$ is a substituted or unsubstituted polyvalent hydrocarbon bridging group of about 1 to 20 carbon atoms and of valence n+m, including alkylene and arylene, optionally including in the backbone 1 to 5 moieties selected from the group consisting of —O—, —C(O)—, —S—, —SO$_2$— and —NR$^5$— groups (an combinations thereof such as —C(O)—O—), wherein $R^5$ is hydrogen, acetyl, or a alkyl group of 1 to 6 carbon atoms. Preferably $R^3$ is a divalent alkylene.

Y is a phosphorus-containing group, and m and n are independently 1 to 4.

Preferred surface modifying agents include those with the following formula:

$$P_a\text{—}R^3\text{—}Si\text{—}(Y)_b(R^4)_{3-b} \quad \text{(II)}$$

wherein:

P is a phosphorus-containing functional group, including phosphorus-oxygen groups, phosphorus-nitrogen groups and phosphorus-halogen groups.

$R^3$ is a substituted or unsubstituted polyvalent hydrocarbon bridging group of about 1 to 20 carbon atoms, of valence a+b, optionally including in the backbone 1 to 5 moieties selected from the group consisting of —O—, —C(O)—, —S—, —SO$_2$— and —NR$^5$— groups, wherein $R^5$ is hydrogen, acetyl, or a alkyl group of 1 to 6 carbon atoms. Preferably $R^3$ is a divalent alkylene.

Y is —OR$^6$ where $R^6$ is an alkyl, aryl, heteroaryl, or aralkyl group of 1 to 8 carbon atoms, preferably methyl or ethyl;

$R^4$ is independently an alkyl, aryl, aralkyl or alkoxy group of 1 to 8 carbon atoms optionally substituted in available positions by oxygen, nitrogen and/or sulfur atoms;

a is 1 or 2; and b is 1 to 3.

It should be understood that the silyl groups of the surface modifying agents of Formula II may hydrolyze, in which case one or more of the "Y" or "OR$^4$", groups will be converted to a silanol or silanolate.

Examples of suitable inorganic nanoparticles include silica and metal oxide nanoparticles including zirconia, titania, ceria, alumina, iron oxide, vanadia, antimony oxide, tin oxide, alumina/silica, carbonates such as calcium carbonate, and combinations thereof. The nanoparticles have an average particle diameter less than about 100 nm, preferably no greater than about 50 nm, more preferably from about 3 nm to about 50 nm, even more preferably from about 3 nm to about 20 nm, most preferably from about 3 nm to about 10 nm. If the nanoparticles are aggregated, the maximum cross sectional dimension of the aggregated particle is within any of these preferable ranges.

A variety of methods are available for modifying the surface of nanoparticles including, e.g., adding the surface modifying agent to nanoparticles (e.g., in the form of a powder or a colloidal dispersion or suspension) and allowing the surface modifying agent to react with the nanoparticles. Other useful surface modification processes are described in, e. U.S. Pat. No. 2,801,185 (Iler) and U.S. Pat. No. 4,522,958 (Das et al.), and incorporated herein. Alternatively, the surface modifying agent may be coated on the surface of the inorganic nanoparticles (i.e. not covalently-or ionically bonded).

The surface modifying agent of Formulas I and II are used in amounts sufficient to react with 10 to 100% of the available functional groups on the inorganic nanoparticle (for example the number of available hydroxyl functional groups on silica nanoparticles). The number of functional groups is experimentally determined where a quantity of nanoparticles are reacted with an excess of surface modifying agent so that all available reactive sites are functionalized with a surface modifying agent. Lower percentages of functionalization may then be calculated from the result.

Generally, the amount of surface modifying agent is used in amount sufficient to provide up to twice the equal weight of surface modifying agent relative to the weight of inorganic nanoparticles. Preferably the weight ratio of surface modifying agent to inorganic nanoparticles is 2:1 to 1:10.

The surface-modified nanoparticles can be added to the polymer in amounts sufficient to provide a composition that has reduced flammability (as measured by comparison to the neat polymer), preferably in amounts sufficient to provide a composition that is self-extinguishing. Surface-modified nanoparticles may be present in the composition in varying amounts including, e.g., from about 5 to 50 wt. %, preferably from about 10 to 50 weight % based on the total weight of the composition. The surface-modified nanoparticles are preferably dispersed throughout the polymer, more preferably dispersed homogeneously throughout the polymer.

When considering the surface modifying agent, and molecular weights thereof, the nanoparticles and amounts thereof, the surface modified nanoparticles are added to the polymer in amounts sufficient so that the phosphorus group content of the polymer composition or polymerizable composition is 0.25 to 10 weight %, preferably from 0.5 to 5 weight percent.

If desired, the particles may further comprise a secondary surface modifying agent in addition to the ambifunctional surface modifying agent. Such secondary surface modify agents have surface groups that modify the solubility characteristics of the nanoparticles. The surface groups are selected to render the nanoparticle compatible with the polymer or polymerizable mixture (e.g. polymerizable monomers). Where used, such secondary surface modifying agents are used in amounts sufficient to react with 1 to 100% of the available functional groups on the surface of the nanoparticles remaining after functionalization with the ambifunctional surface modifying agent (of formula I or II).

Generally 0 to 80% of the available functional groups on the surface of the inorganic nanoparticles may be functionalized with a secondary surface-modifying agent before or after to functionalization with the ambifunctional surface modifying agent.

Suitable surface groups can also be selected based upon the solubility parameter of the surface group and the polymer (or polymerizable mixture). Preferably the surface group, or the agent from which the surface group is derived, has a solubility parameter similar to the solubility parameter of the polymer. When the polymer is hydrophobic, for example, one skilled in the art can select from among various hydrophobic surface groups to achieve a surface-modified particle that is compatible with the hydrophobic polymer. Similarly, when the polymer is hydrophilic, one skilled in the art can select from hydrophilic surface groups. The particle can also include at least two different surface groups that combine to provide a particle having a solubility parameter that is similar to the solubility parameter of the polymer.

Suitable classes of secondary surface-modifying agents include, e.g., silanes, organic acids organic bases and alcohols.

Particularly useful secondary surface-modifying agents include silanes. Examples of useful silanes include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri(t-butoxy)silane, vinyltris(isobutoxy) silane, vinyltris(isopropenoxy)silane and vinyltris(2-methoxyethoxy)silane; trialkoxyarylsilanes; isooctyltrimethoxy-silane; N-(3-triethoxysilylpropyl) methoxyethoxyethoxy ethyl carbamate; N-(3-triethoxysilylpropyl) methoxyethoxyethoxyethyl carbamate; silane functional (meth)acrylates including, e.g., 3-(methacryloyloxy) propyltrimethoxysilane, 3-acryloyloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) methyltriethoxysilane, 3-(methacryloyloxy) methyltrimethoxysilane, 3-(methacryloyloxy)propyldimethylethoxysilane, 3-(methacryloyloxy) propenyltrimethoxysilane and 3-(methacryloyloxy)propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e.g., methoxy and hydroxy substituted alkyl silanes, and combinations thereof.

Useful organic acid secondary surface-modifying agents include, e.g., oxyacids of carbon (e.g., carboxylic acid), sulfur and phosphorus, and combinations thereof.

Representative examples of polar secondary surface-modifying agents having carboxylic acid functionality include $CH_3O(CH_2CH_2O)_2CH_2COOH$ and 2-(2-methoxyethoxy) acetic acid having the chemical structure $CH_3OCH_2CH_2OCH_2COOH$ (hereafter MEAA) and mono (polyethylene glycol) succinate.

Representative examples of non-polar secondary surface-modifying agents having carboxylic acid functionality include octanoic acid, dodecanoic acid and oleic acid.

Examples of suitable phosphorus containing acids include phosphonic acids including, e.g., octylphosphonic acid, laurylphosphonic acid, decylphosphonic acid, dodecylphosphonic acid and octadecylphosphonic acid.

Useful organic base secondary surface-modifying agents include, e.g., alkylamines including, e.g., octylamine, decylamine, dodecylamine and octadecylamine.

Examples of other useful non-silane secondary surface modifying agents include methacrylic acid, β-carboxyethyl acrylate, mono-2-(methacryloyloxyethyl) succinate, and combinations thereof A useful surface modifying agent that imparts both polar character and reactivity to the nanoparticles is mono(methacryloyloxypolyethyleneglycol)succinate.

Examples of suitable secondary surface-modifying alcohols include, e.g., aliphatic alcohols including, e.g., octadecyl, dodecyl, lauryl and furfuryl alcohol, alicyclic alcohols including, e.g., cyclohexanol, and aromatic alcohols including, e.g., phenol and benzyl alcohol, and combinations thereof. Examples of secondary surface-modifying groups particularly suitable for epoxy resin compositions are disclosed in U.S. Pat. No. 5,648,407 (Goetz et al.) and incorporated herein by reference.

Examples of useful organic polymers include natural and synthetic rubber resins including thermosettable rubbers as well as thermoplastic rubbers and elastomers including, e.g., nitrile rubbers (e.g., acrylonitrile-butadiene), polyisoprene rubber, polychloroprene rubber, polybutadiene rubber, butyl rubber, ethylene-propylene-diene monomer rubbers (EPDM), Santoprene« polypropylene-EPDM elastomers, ethylene-propylene rubber, styrene-butadiene copolymers, styrene-isoprene copolymers, styrene-butadiene-styrene rubber, styrene-isoprene-styrene rubber, styrene-ethylene-butylene-styrene rubber, styrene-ethylene-propylene-styrene rubber, polyisobutylene rubber, ethylene vinyl acetate rubbers, silicone rubbers including, e.g., polysiloxanes, methacrylate rubbers, polyacrylate rubbers including, e.g., copolymers of isooctyl acrylate and acrylic acid, polyesters, polyether esters, polyvinyl ethers, polyurethanes and blends and combinations thereof, including e.g., linear, radial, star and tapered block copolymers thereof.

Other useful elastomers include, e.g., fluoroelastomers including, e.g., polytrifluoroethylene, polyvinylidene fluoride, hexafluoropropylene and fluorinated ethylene-propylene copolymers, fluorosilicones and chloroelastomers including, e.g., chlorinated polyethylene, and combinations thereof.

Examples of useful thermoplastic resins include polyacrylonitrile, acrylonitrile-butadiene-styrene, styrene-acrylonitrile, cellulose and derivatives thereof, chlorinated polyether, ethylenevinylacetate, fluorocarbons including, e.g., polychlorotrifluoroethylene, fluorinated ethylene-propylene and polyvinylidene fluoride, polyamides including, e.g., polycaprolactam, polyhexamethylene adipamide, polyhexamethylene sebacamide, polyundecanoamide, polylauroamide and polyacrylamide, polyimides including, e.g., polyetherimide, polycarbonate, polyolefins including, e.g., polyethylene, polypropylene, polybutene and poly-4-methyl pentene, polyalkylene terephthalates including e.g., polyethyleneterephthalate, polyalkylene oxides including, e.g., polyphenylene oxide, polystyrene, polyurethane, polyisocyanurates, vinyl polymers including, e.g., polyvinyl chloride, polyvinyl acetate, polyvinyl alcohol, polyvinyl butyral, polyvinylpyrrolidone, polyvinylidene chloride and combinations thereof.

Useful thermoset resins include e.g., polyesters and polyurethanes and hybrids and copolymers thereof including, e.g., acylated urethanes and acylated polyesters, amino resins (e.g., aminoplast resins) including, e.g., alkylated urea-formaldehyde resins, melamine-formaldehyde resin, acrylate resins including, e.g., acrylates and methacrylates, vinyl acrylates, acrylated epoxies, acrylated urethanes, acrylated polyesters, acrylated acrylics, acrylated polyethers, vinyl ethers, acrylated oils and acrylated silicones, alkyd resins such as urethane alkyd resins, polyester resins, reactive urethane resins, phenolic resins including, e.g., resole resins, novolac resins and phenol-formaldehyde resins, phenolic/latex resins, epoxy resins including, e.g., bisphenol epoxy resins, aliphatic and cycloaliphatic epoxy resins, epoxy/urethane resin, epoxy/acrylate resin and epoxy/silicone resin, isocyanate resins, isocyanurate resins, polysiloxane resins including alkylalkoxysilane resins, reactive vinyl resins and mixtures thereof.

The present invention also provides a polymerizable mixture comprising the surface modified nanoparticles and a polymerizable monomer. Polymerization can be achieved by various conventional free radical polymerization methods, which can be chemical or radiation initiated, including, e.g., solvent polymerization, emulsion polymerization, suspension polymerization, bulk polymerization and radiation polymerization including, e.g., processes using actinic radiation including, e.g., visible and ultraviolet light, electron beam radiation and combinations thereof. Useful monomers include free-radically polymerizable monomers, addition polymerizable monomers, and condensation polymerizable monomers, such as those used to prepare the thermoplastic and thermoset polymers previously described.

An initiator may be used in an amount effective to facilitate polymerization of the monomers present in the composition and the amount will vary depending upon, for example, the type of initiator, the molecular weight of the initiator, the intended application of the resulting polymer composition and the polymerization process including, e.g., the temperature of the process.

Useful free radical initiators include thermal and photoactive initiators. The type of initiator used depends on the polymerization process. Examples of photoinitiators include benzoin ethers such as benzoin methyl ether and benzoin isopropyl ether, substituted benzoin ethers such as anisoin methyl ether, substituted acetophenones such as 2,2-dimethoxy-2-phenylacetophenone, and substituted alpha-ketols such as 2-methyl-2-hydroxypropiophenone.

The polymerizable composition can also include copolymeric photoinitiators including, e.g., 2-[4-(2-hydroxy-2-methylpropenoyl)phenoxy]ethyl-2-methyl-2-N-propenoylamino propanoate and the polymerizable photoinitiator available under the trade designation DAROCUR ZLJ 3331 from Ciba-Geigy, and photoacid generated initiators including, e.g., diaryliodoniumhexafluoroantimonate available under the trade designation SarCat CD-1012 from Sartomer (Exton, Pa.) and triarylsulfonium hexafluorophosphate available under the trade designation SarCat CD-1011 (Sartomer).

Examples of suitable thermal initiators include peroxides such as benzoyl peroxide, dibenzoyl peroxide, dilauryl peroxide, cyclohexane peroxide, methyl ethyl ketone peroxide, hydroperoxides including, e.g., butyl hydroperoxide and cumene hydroperoxide, dicyclohexyl peroxydicarbonate, t-butyl perbenzoate, and azo compounds, for example, 2,2-azo-bis(isobutyronitrile) (AIBN) and combinations thereof.

Examples of commercially available thermal initiators include initiators available under the "VAZO" trade designation from DuPont Specialty Chemical (Wilmington, Del.) including VAZO 64 (2,2'-azobis(isobutyronitrile)), VAZO 52, VAZO 65 and VAZO 68, as well as thermal initiators available under the trade designation "Lucidol" from Elf Atochem North America, (Philadelphia, Pa.), and initiators available under the Celogen trade designation from Uniroyal Chemical Co. (Middlebury, Conn.).

Suitable free-radically polymerizable compounds containing at least one ethylenically unsaturated double bond, may be monomers and/or oligomers, such as (meth)acrylates, (meth)acrylamides, and other vinyl compounds capable of undergoing free-radical polymerization. Ethylenically unsaturated free radically polymerized materials may be monomers, oligomers, or blends thereof. Useful classes include, for example, vinyl-functional monomers that are monofunctional, difunctional or polyfunctional; free radically polymerizable macromers; and ethylenically unsaturated free-radically polymerizable polysiloxanes. Generally, the most useful ethylenically unsaturated free radically polymerizable monomers employed in this invention are vinyl-functional starting materials. Such vinyl starting materials include but are not limited to acrylic acid and its esters, methacrylic acid and its esters, vinyl-substituted aromatics, vinyl-substituted heterocyclics, vinyl esters, vinyl chloride, acrylonitrile, methacrylonitrile, acrylamide and derivatives thereof, methacrylamide and derivatives thereof, and other vinyl monomers polymerizable by free-radical means. Such monomers and specific examples are more fully described in U.S. Pat. No. 4,985,340, and such description is incorporated herein by reference.

Such monomers include mono-, di-, or polyacrylates and methacrylates such as methyl acrylate, methyl methacrylate, ethyl acrylate, isopropyl methacrylate, isooctyl acrylate, acrylic acid, n-hexyl acrylate, 2-ethylhexyl acrylate, stearyl acrylate, allyl acrylate, glycerol diacrylate, glycerol triacrylate, ethylene glycol diacrylate, diethylene glycol diacrylate, triethylene glycol dimethacrylate, 1,3-propanediol dimethacrylate, 1,6-hexanediol diacrylate, trimethylolpropane triacrylate, 1,4-cyclohexanediol diacrylate, pentaerythritol triacrylate, -tetraacrylate and -tetramethacrylate, the bisacrylates and bis-methacrylates of polyethylene gycols of molecular weight 200-500; multi-reactive monomers such as epoxy(meth)acrylates, isocyanatoalkyl(meth)acrylates such as isocyanatoethyl(meth)acrylate, hydroxyalkyl(meth)acrylates, such as hydroxyethyl-and hydroxypropyl(meth)acrylates, acrylated epoxies, such as ethoxylated bisphenol A di(meth)acrylate, glycidyl(meth)acrylate; unsaturated amides such as acrylamide, methylene bis-acrylamide and β-methacrylaminoethyl methacrylate; and vinyl compounds such as styrene, divinylbenzene, divinyl adipate and various vinyl azlactones as are disclosed in U.S. Pat. No. 4,304,705. Mixtures of more than one monomer can be used as desired.

Suitable cationically polymerizable monomers and/or oligomers typically contain at least one cationically polymerizable group such as epoxides, cyclic ethers, vinyl ethers, vinylamines, side-chain unsaturated aromatic hydrocarbons, lactones and other cyclic esters, lactams, oxazolines, cyclic carbonates, cyclic acetals, aldehydes, cyclic amines, cyclic sulfides, cyclosiloxanes, cyclotriphosphazenes, certain olefins and cycloolefins, and mixtures thereof, preferably epoxides and vinyl ethers. Other cationically polymerizable groups or monomers described in G. Odian, "Principles of Polymerization" Third Edition, John Wiley & Sons Inc., 1991, NY. and "Encyclopedia of Polymer Science and Engineering," Second Edition, H. F. Mark, N. M. Bikales, C. G.

Overberger, G. Menges, J. I. Kroschwitz, Eds., Vol. 2, John Wiley & Sons, 1985, N.Y., pp. 729-814 are also useful in the practice of the present invention.

Particularly useful examples include cyclic ether monomers, including epoxide monomers described in U.S. Pat. No. 4,985,340 and such description is incorporated herein by reference. A wide variety of commercial epoxy resins are available and listed in "Handbook of Epoxy Resins" by Lee and Neville, McGraw Hill, N.Y. (1967) and in "Epoxy Resin Technology" by P. F. Bruins, John Wiley & Sons, New York (1968). Preferably, when used in conductive adhesives, the epoxy resins are "electronic grade," that is, low in ionic contaminants.

Cationically-polymerizable vinyl and vinyl ether monomers are also particularly useful in the practice of this invention and are described in U.S. Pat. No. 4,264,703, and such description is incorporated herein by reference.

Useful epoxy resins can include propylene oxide, epichlorohydrin, styrene oxide and epoxies based upon bisphenol A, such as, EPON-828-LS™ electronic grade epoxy resins available from Shell Chemicals, or novolac epoxies, such as, EPON-164™ (also available from Shell Chemicals) or their equivalents from other manufacturers. Additional useful epoxy resins include dicyclopentadiene dioxide, epoxidized polybutadiene such as the Poly BD™ resins available from Elf Atochem, 1,4-butanediol diglycidyl ether, and resorcinol diglycidyl ether. Also useful are the cycloaliphatic epoxies, such as cyclohexene oxide and the ERL™ series of resins available from Union Carbide, such as vinylcyclohexene dioxide (ERL-4206™), 3,4-epoxycyclohexylmethyl-3,4-epoxycyclohexanecarboxylate (ERL-4221™), bis(3,4-epoxy-6-methylcyclohexylmethyl) adipate (ERL-4299™); 1,4-butanediol diglycidyl ether, (for example, Heloxy 67™ available from Shell Chemical), polyglycidyl ether of phenolformaldehyde novolak (e.g., DER-431™ and DER-438™, available from Dow Chemical Co., polyglycol diepoxide (e.g., DER 736™, available from Dow Chemical Co.), and mixtures thereof as well as mixtures thereof with co-curatives, curing agents or hardeners that also are well known. Representative of these well-known co-curatives or hardeners that can be used are acid anhydrides such as maleic anhydride, cyclopentanetetracarboxylic acid dianhydride, pyromellitic anhydride, cis-1,2-cyclohexanecarboxylic acid anhydride, amine curing agents (such as 2,4,6-tris(dimethylaminomethyl)phenol, diethylene triamine, tetraethylene pentamine, phenalkamines, and materials sold under trade names such as Jeffamine™ and Versamide™) and mixtures thereof.

When preparing compositions containing epoxy monomers, hydroxy-functional materials can be added. The hydroxyl-functional component can be present as a mixture or a blend of materials and can contain mono-and poly-hydroxyl containing materials. Preferably, the hydroxyl-functional material is at least a diol. When used, the hydroxyl-functional material can aid in chain extension and preventing excess crosslinking of the epoxy during curing, e.g., increasing toughness of the cured composition.

When present, useful hydroxyl-functional materials include aliphatic, cycloaliphatic or alkanol-substituted arene mono-or poly-alcohols having from about 2 to about 18 carbon atoms and two to five, preferably two to four hydroxy groups, or combinations thereof. Useful mono-alcohols can include methanol, ethanol, 1-propanol, 2-propanol, 2-methyl-2-propanol, 1-butanol, 2-butanol, 1-pentanol, neopenyl alcohol, 3-pentanol, 1-hexanol, 1-heptanol, 1-octanol, 2-phenoxyethanol, cyclopentanol, cyclohexanol, cyclohexylmethanol, 3-cyclohexyl-1-propanol, 2-norbornanemethanol and tetrahydrofurfuryl alcohol.

Polyols useful in the present invention include aliphatic, cycloaliphatic, or alkanol-substituted arene polyols, or mixtures thereof having from about 2 to about 18 carbon atoms and two to five, preferably two to four hydroxyl groups.

Examples of useful polyols include 1,2-ethanediol, 1,2-propanediol, 1,3-propanediol, 1,4-butanediol, 1,3-butanediol, 2-methyl-1,3-propanediol, 2,2-dimethyl-1,3-propanediol, 2-ethyl-1,6-hexanediol, 1,5-pentanediol, 1,6-hexanediol, 1,8-octanediol, neopentyl glycol, glycerol, trimethylolpropane, 1,2,6-hexanetriol, trimethylolethane, pentaerythritol, quinitol, mannitol, sorbitol, diethlene glycol, triethylene glycol, tetraethylene glycol, glycerine, 2-ethyl-2-(hydroxymethyl)-1,3-propanediol, 2-ethyl-1,3-pentanediol, 1,4-cyclohexanedimethanol, 1,4-benzenedimethanol, and polyalkoxylated bisphenol A derivatives. Other examples of useful polyols are disclosed in U.S. Pat. No. 4,503,211.

Higher molecular weight polyols include the polyethylene and polypropylene oxide polymers in the molecular weight ($M_n$) range of 200 to 20,000 such as the Carbowax™ polyethyleneoxide materials available from Union Carbide, caprolactone polyols in the molecular weight range of 200 to 5,000 such as the Tone™ polyol materials available from Union Carbide, polytetramethylene ether glycol in the molecular weight range of 200 to 4,000, such as the Terathane™ materials available from DuPont, polyethylene glycol, such as PEG 200 available from Union Carbide, hydroxyl-terminated polybutadiene resins such as the Poly BD™ materials available from Elf Atochem, phenoxy resins, such as those commercially available from Phenoxy Associates, Rock Hill, S.C., or equivalent materials supplied by other manufacturers.

Acid-catalyzed step growth polymerizations include, but are not limited to, the reaction of multifunctional isocyanates (polyisocyanates) with multifunctional alcohols (polyols) to form polyurethanes, the reaction of multifunctional epoxies with multifunctional alcohols, and the cyclotrimerization of multifunctional cyanate esters to crosslinked polytriazine resins.

Particularly useful multifunctional alcohol, isocyanate, and epoxide components that can be cured by acid-catalyzed step-growth polymerization using catalysts of the present invention are described in U.S. Pat. Nos. 4,985,340, 4,503, 211 and 4,340,716, and such description is incorporated herein by reference.

Suitable multifunctional cyanate esters that can be cured by catalyzed cyclotrimerization are described in U.S. Pat. Nos. 5,143,785 and 5,215,860 and such description is incorporated herein by reference. Suitable multireactive monomers that can be cured include glycidyl(meth)acrylate, hydroxy(alkyl) (meth)acrylates such as hydroxyethyl acrylate, isocyanatoethyl methacrylate, and the like.

Mixtures of aforementioned classes of monomers with additives such as tackifiers, hardeners, co-curatives, curing agents, stabilizers, sensitizers etc. can also be used in the polymerizable compositions of this invention. Furthermore, adjuvants, such as pigments, abrasive granules, stabilizers, light stabilizers, antioxidants, flow agents, bodying agents, flatting agents, antistats, colorants, inert fillers, binders, blowing agents, fungicides, bacteriocides, surfactants, plasticizers, and other additives as known to those skilled in the art can be added to the compositions of this invention. These can be added in an amount effective for their intended purpose, as long as they do not interfere with the polymerization of the compositions of the invention. Additionally, in compositions containing radiation-sensitive catalysts or initiators it is preferable that the adjuvants do not absorb radiation to which the catalysts or initiators are responsive.

Solvents, preferably organic, can be used to assist in dispersing the nanoparticles in the polymerizable monomers described supra and as a processing aid. Representative solvents include acetone, methyl ethyl ketone, cyclopentanone, methyl cellosolve acetate, methylene chloride, nitromethane, methyl formate, acetonitrile, gamma-butyrolactone, 1,2-dimethoxyethane (glyme), 3-methyl sulfolane, and propylene carbonate.

After polymerization, the resulting polymer may be crosslinked. Crosslinking can be achieved with or without a cross-linking agent by using high-energy radiation such as gamma or electron beam radiation. A cross-linking agent or a combination of crosslinking agents can be added to the mixture of polymerizable monomers to facilitate cross-linking.

Useful radiations curing cross-linking agents include multifunctional acrylates, such as those disclosed in U.S. Pat. No. 4,379,201 (Heilmann et al.), which include 1,6-hexanediol diacrylate, trimethylolpropane triacrylate, 1,2-ethylene glycol diacrylate, pentaerythritol tetraacrylate, 1,12-dodecanol diacrylate, and combinations thereof, and copolymerizable aromatic ketone co-monomers such as those disclosed in U.S. Pat. No. 4,737,559 (Kellen et al.), and incorporated herein. Suitable ultraviolet light sources include, e.g., medium pressure mercury lamps and ultraviolet black light.

Useful condensation polymerizable monomers include those used to prepare polyesters, polyethers, polycarbonates, polyureas and polyurethanes.

Various methods may be employed to combine the surface-modified nanoparticles and the polymer. In one method, a colloidal dispersion of surface-modified nanoparticles and polymer are combined. Solvent present in the composition is then removed, leaving the surface-modified nanoparticles dispersed in the polymer. Evaporation including, e.g., distillation, rotary evaporation or oven drying may remove the solvent. Optionally, for some colloidal dispersions, e.g., aqueous colloidal dispersions, prior to addition of the polymer, a cosolvent (e.g., methoxy-2-propanol or N-methylpyrrolidone) may be added to the colloidal dispersion to assist removal of water. Water may also be removed by azeotropic distillation with an immiscible solvent such as toluene. After the polymer is added, the water and cosolvent are removed.

Another method for incorporating colloidal dispersions of surface-modified nanoparticles into a polymer includes drying the colloidal dispersion of surface-modified nanoparticles to a powder, followed by addition of the polymer or at least one component of the polymer into which the nanoparticles are to be dispersed. The drying step may be accomplished by conventional means such as oven drying or spray drying. The surface-modified nanoparticles preferably have a sufficient amount of surface groups to prevent irreversible agglomeration or irreversible aggregation upon drying. The drying time and the drying temperature is preferably minimized for nanoparticles having less than 100% surface coverage.

Alternatively, the nanoparticles may be compounded by melt processing. In this embodiment, the surface modified nanoparticle and the thermoplastic polymer are combined and the mixture melted with sufficient agitation to provide a uniform mixture. Alternatively the nanoparticles and pellets or powders of the thermoplastic polymer may be combined, and intimately mixed prior to melting.

In another embodiment, the surface modified nanoparticles may be dispersed in a polymerizable monomer or mixture of monomers, which are then polymerized. The monomers may be thermally-, free-radically or photochemically polymerized, is the presence of an appropriate catalyst, such as are know in the art. If desired, the polymerizable mixture may be foamed using techniques and foaming agents as are known in the art. Reference may be made to U.S. Pat. No. 6,586,483 (Baran et al.) incorporated herein by reference.

EXAMPLES

Unless otherwise noted, all reagents and solvents were or can be obtained from Alfa Aesar, Ward Hill, Mass.

Preparative Example 1

Preparation of Glycidyl Azide Polymer Having a Triethoxysilane Group (GAP-silane)

A solution of approximately 40 weight percent hydroxy-terminated glycidyl azide polymer in ethyl acetate (20.0 g) was mixed with 3-isocyanatotriethoxysilane (2.90 g) in ethyl acetate (20.0 g). Dibutyl tin dilaurate (1 drop) was added and the mixture was magnetically stirred overnight at room temperature. The ethyl acetate was removed under reduced pressure using a rotary evaporator to afford the GAP-silane product (23.28 g). No absorbances attributable to isocyanate groups were observed in the infrared spectrum of the product. Further details regarding the preparation of the glycidyl azide polymer and the GAP-silane may be found in Applicant's copending application U.S. Ser. No. 11/141,877 filed Jun. 1, 2005, incorporated herein by reference.

Example 1

Preparation of GAP-and Isooctyl-modified Silica Nanoparticles

Ammonium-stabilized silica sol (100.0 g; NALCO 2326, obtained from Nalco Chemical Co., Naperville, Ill.), 1-methoxy-2-propanol (112.5 g), the GAP-silane product of Example 1 (3.55 g), diethylphosphatoethyltriethoxysilane (1.26 g, from Gelest, Morrisville, Pa.) and isooctyltrimethoxysilane (7.16 g, from Gelest, Morrisville, Pa.) were combined in a 3 neck flask, stirred and heated to 80° C. for 18 hours. The mixture was poured into a glass dish, then dried in a forced air oven at 130° C. to afford 15.62 g of the product as a slightly yellow solid powder.

Example 2

Preparation of Phosphate Ester Containing Silica Nanoparticles

Ammonium-stabilized silica sol (100.0 g; NALCO 2326, obtained from Nalco Chemical Co., Naperville, Ill.), 1-methoxy-2-propanol (112.5.0 g), diethylphosphatoethyltriethoxysilane (2.51 g, from Gelest, Morrisville, Pa.) and isooctyltrimethoxysilane (7.16 g, from Gelest, Morrisville, Pa.) were combined in a 3 neck flask, stirred and heated to 80° C. for 16 hours. The mixture was poured into a glass dish, then dried in a forced air oven at 150° C. to afford 19.15 g of the product as a white solid powder.

The invention claimed is:

1. A flame retardant polymer composition comprising an organic polymer having dispersed therein surface-modified silica nanoparticles, said surface modified silica nanoparticles modified by a surface modifying agent of the formula:

$$X_n - R^1 - Y_m \qquad (I)$$

wherein:

X represents a silyl functional group that may bond to the surface of the silica nanoparticles, R¹ is a substituted or unsubstituted polyvalent hydrocarbon bridging group of about 1 to 20 carbon atoms and of valence n+m;

Y is a phosphorus-containing group, and m and n are independently 1 to 4; wherein said surface-modified silica nanoparticles comprises 5 to 50 wt.% of the total weight of the composition.

2. The polymer composition of claim 1 wherein the phosphorus-containing group is selected from phosphonic acids, phosphonates, phosphinates, phosphonites, phosphinites, phosphine oxides, phosphines, phosphites or phosphates.

3. The polymer composition of claim 1 wherein said particles of said silica nanoparticles are 5 to 100 nanometers average particle size.

4. The polymer composition of claim 3 wherein said nanoparticles are 3 to 20 nanometers average particle size.

5. The polymer composition of claim 1 wherein said polymer is selected from thermoplastic and thermoset polymers.

6. The polymer composition of claim 1 wherein said silica nanoparticles are covalently or ionically bonded to said surface modifying agent.

7. The polymer composition of claim 6 wherein said phosphorus-containing group is bonded to the surface of said nanoparticles with an ambifunctional silane surface modifying agent.

8. The polymer composition of claim 7 wherein said ambifunctional silane surface modifying agent is of the formula

wherein:

P is a phosphorus-containing functional group;

R³ is a polyvalent hydrocarbon bridging group of about 1 to 20 carbon atoms, of valence a +b,;

Y is —OR⁶ where R⁶ is an alkyl, aryl, heteroaryl, or aralkyl group of 1 to 8 carbon atoms;

R⁴ is independently an alkyl, aryl, aralkyl or alkoxy group of 1 to 8 carbon atoms;

a is 1 or 2; and b is 1 to 3.

9. The polymer composition of claim 1 wherein the weight ratio of surface modifying agent to silica nanoparticles is 2:1 to 1:10.

10. The polymer composition of claim 1 wherein 10 to 100% of the available functional groups on the surface of the silica nanoparticles are modified by said surface modifying agent.

11. The polymer composition of claim 1 wherein said functionalized nanoparticles further comprises a secondary surface-modifying agent.

12. The polymer composition of claim 11 wherein 1 to 100% of the available functional groups on the surface of the silica nanoparticles are modified by the secondary surface modifying agent.

13. The polymerizable composition of claim 12 wherein said surface modified nanoparticles further comprises a secondary surface-modifying agent.

14. The polymer composition of claim 1 wherein the phosphorus group content of the polymer composition is 0.25 to 10 weight %.

15. A polymerizable composition comprising one or more polymerizable monomers and surface-modified silica nanoparticles, said surface modified silica nanoparticles modified by a surface modifying agent of the formula:

wherein:

X represents a functional group that may bond to the surface of the inorganic nanoparticles, R¹ is a substituted or unsubstituted polyvalent hydrocarbon bridging group of about 1 to 20 carbon atoms and of valence n+m;

Y is a phosphorus-containing group, and m and n are independently 1 to 4; wherein said surface modified nanoparticle phase comprises 5 to 50 weight % of said composition.

16. The polymerizable composition of claim 15 wherein said polymerizable monomers are selected from free-radically polymerizable monomers, cationically polymerizable monomers, addition polymerizable monomers, and condensation polymerizable monomers.

17. The polymerizable composition of claim 16 wherein said free-radically polymerizable monomers are selected from acrylic acid and its esters, methacrylic acid and its esters, vinyl-substituted aromatics, vinyl-substituted heterocyclics, vinyl esters, vinyl chloride, acrylonitrile, methacrylonitrile, acrylamide and derivatives thereof, methacrylamide and derivatives thereof 18. The polymerizable composition of claim 16 wherein said cationically polymerizable monomers are selected from epoxides, cyclic ethers, vinyl ethers, vinylamines, side-chain unsaturated aromatic hydrocarbons, lactones, lactams, oxazolines, cyclic carbonates, cyclic acetals, aldehydes, cyclic amines, cyclic sulfides, cyclosiloxanes, cyclotriphosphazenes, cycloolefins, and mixtures thereof.

19. The polymerizable composition of claim 15 wherein said surface modified nanoparticles are silica surface modified nanoparticles and said surface modifying agent is bonded to the surface of said nanoparticles with an ambifunctional silane coupling agent.

* * * * *

UNITED STATES PATENT AND TRADEMARK OFFICE
CERTIFICATE OF CORRECTION

PATENT NO. : 7,767,736 B2  
APPLICATION NO. : 11/275033  
DATED : August 3, 2010  
INVENTOR(S) : Jimmie R Baran Page 1 of 1

It is certified that error appears in the above-identified patent and that said Letters Patent is hereby corrected as shown below:

Title Page, Item (56)
Under "Other Publications", line 2, delete "nanocompsites" and insert -- nanocomposites --.

Column 4,
Line 22, delete "e. U.S. Pat. No." and insert -- e.g., U.S. Pat. Nos. --.

Column 8,
Line 43, delete "gycols" and insert -- glycols --.

Column 9,
Line 33, delete "methylcyclohexylmethyl) adipate" and insert -- methylcyclohexylmethyl)adipate --.
Line 36, delete "novolak" and insert -- novolac --.
Line 65, delete "neopenyl" and insert -- neophenyl --.

Column 10,
Line 13, delete "diethlene" and insert -- diethylene --.

Column 11,
Line 66, delete "free-radically or" and insert -- free-radically- or --.

Column 13,
Line 34, delete "a +b,;" and insert -- a+b; --.

Column 14,
Line 15, delete "$X_n\text{-}{_R}^1\text{-}Y_m$" and insert -- $X_n\text{-}R^1\text{-}Y_m$ --.
Line 38, delete "thereof" and insert -- thereof. --.

Signed and Sealed this

Second Day of November, 2010

David J. Kappos
*Director of the United States Patent and Trademark Office*